(12) United States Patent
Schlehbusch et al.

(10) Patent No.: US 6,536,563 B1
(45) Date of Patent: Mar. 25, 2003

(54) BRAKE WITH ADJUSTABLE PLAY

(75) Inventors: Karl-Heinz Schlehbusch, Dinslaken (DE); Burkhard Gärtner, Dinslaken (DE)

(73) Assignee: Pintsch Bamag Antriebs-und Verkehrstechnik GmbH, Dinslaken (DE)

(*) Notice: Subject to any disclaimer, the term of this patent is extended or adjusted under 35 U.S.C. 154(b) by 0 days.

(21) Appl. No.: 09/856,329

(22) PCT Filed: Nov. 22, 1999

(86) PCT No.: PCT/EP99/08983

§ 371 (c)(1),
(2), (4) Date: Aug. 30, 2001

(87) PCT Pub. No.: WO00/31432

PCT Pub. Date: Jun. 2, 2000

(30) Foreign Application Priority Data

Nov. 20, 1998 (DE) ...................................... 298 20 814 U

(51) Int. Cl.$^7$ .................................................. B60L 7/00
(52) U.S. Cl. ...................... 188/161; 188/72.6; 188/164; 188/171
(58) Field of Search .............................. 188/71.1, 71.7, 188/72.1, 72.6, 161, 156, 158, 164, 171, 1.11 L; 310/77, 93, 103

(56) References Cited

U.S. PATENT DOCUMENTS

| | | | |
|---|---|---|---|
| 2,543,830 A | | 3/1951 | Burrus et al. |
| 3,357,528 A | * | 12/1967 | Verlinde ..................... 188/171 |
| 4,136,634 A | * | 1/1979 | Wilson ................. 188/1.11 W |
| 4,280,073 A | * | 7/1981 | Miller .......................... 310/77 |
| 4,299,857 A | * | 11/1981 | Robins et al. ........... 188/1.11 L |
| 4,966,255 A | * | 10/1990 | Fossum ..................... 188/71.8 |
| 5,154,261 A | * | 10/1992 | Tanaka et al. .............. 188/171 |
| 5,515,953 A | * | 5/1996 | Tamura et al. .......... 188/251 A |
| 6,237,730 B1 | * | 5/2001 | Dropmann et al. ......... 188/171 |

FOREIGN PATENT DOCUMENTS

| | | |
|---|---|---|
| DE | 2242073 | 3/1974 |
| DE | 2660855 | 12/1977 |
| DE | 148250 | 5/1981 |
| DE | 3338289 | 5/1985 |
| DE | 3920148 | 1/1991 |
| DE | 19819141 A1 * | 12/1998 |
| DE | 29820822 | 3/1999 |
| EP | 520727 | 12/1992 |
| FR | 2319232 | 2/1977 |
| GB | 2302574 | 1/1997 |

OTHER PUBLICATIONS

Article from "Trade and Industry News" entitled Baureihe aus Dresden, vol. 47, No. 10, Oct. 1, 1995, p. 64.

* cited by examiner

Primary Examiner—Matthew C. Graham
Assistant Examiner—Mariano Sy
(74) Attorney, Agent, or Firm—Marshall, Gerstein & Borun

(57) ABSTRACT

A brake apparatus has a base plate and a first brake disk movable in an axial direction. The apparatus also has a second brake disk positioned remote from the base plate relative to the first brake disk. A brake operating device is connected essentially torsion-proof with the first and second brake disks and is positioned between the base plate and the first and second brake disks. A friction lining is positioned between the first and second brake disks and is carried on an input shaft in a torsion-proof manner relative to the shaft. The input shaft is rotatable relative to the base plate. A sleeve type spacer has a fastener passing through the sleeve. The sleeve is adjustable in the axial direction to keep a distance between the first and second brake disks. The sleeve and the fastener axially retain the second brake disk at the selected distance from the first brake disk during operation of the brake apparatus.

29 Claims, 2 Drawing Sheets

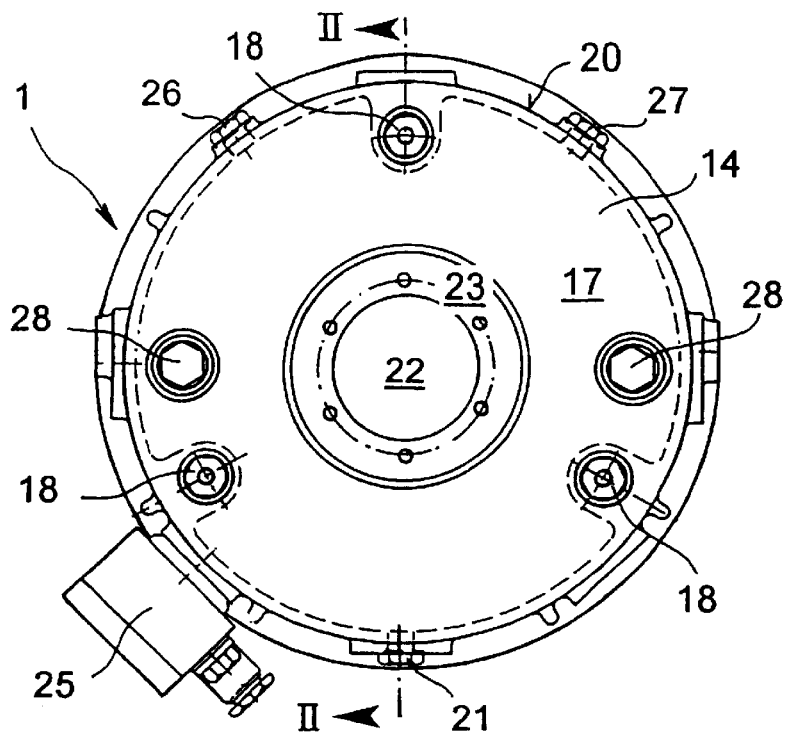
FIG.1
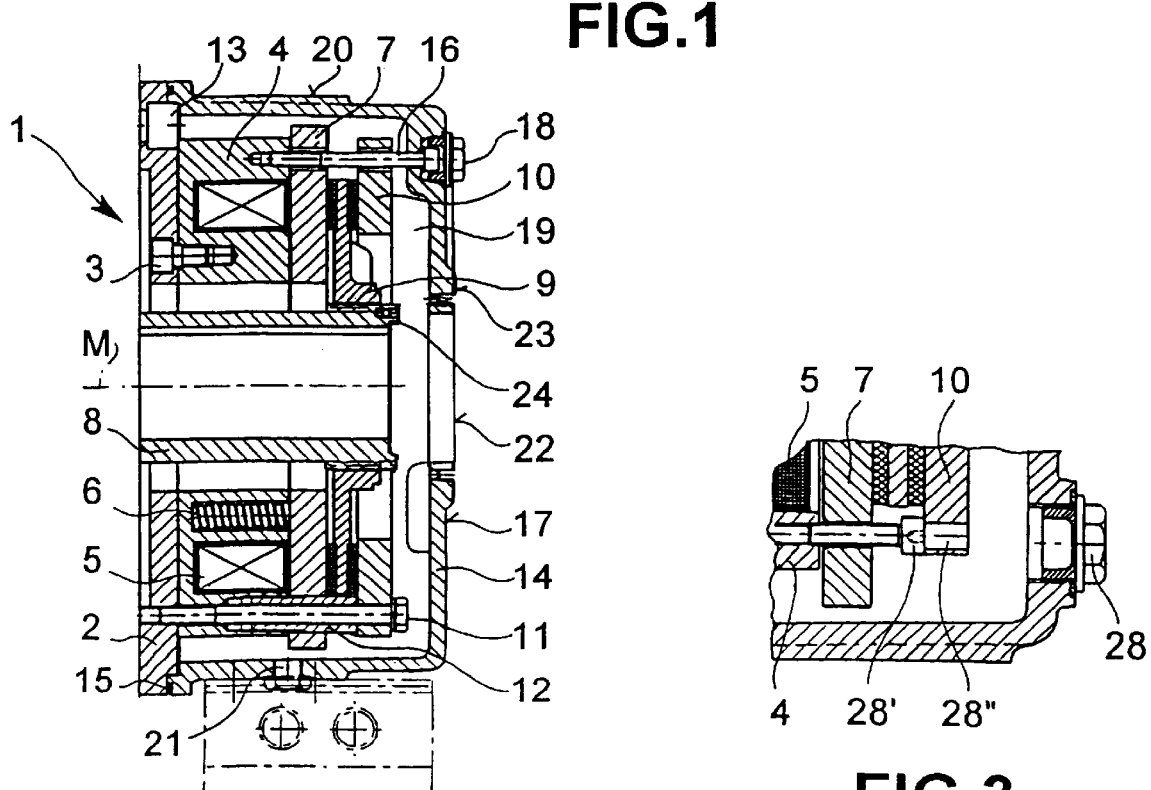
FIG.2
FIG.3

BRAKE WITH ADJUSTABLE PLAY

FIELD OF THE INVENTION

The invention concerns a brake with a base plate, with which a brake operating device and two brake disks are connected essentially torsion-proof, and with a friction lining arranged to move between the brake disks, connected essentially torsion-proof to an input shaft rotatable relative to the base plate, in which the brake disk facing the base plate is axially moveable and the brake disk facing away from the base plate is axially fixed during operation and kept at a spacing from the axially moving brake disk by a spacer.

BACKGROUND OF THE INVENTION

Such brakes are known from the prior art and are used, for example, for externally and internally ventilated motors in traveling, traversing and hoisting mechanisms on crane units. The base plate is then connected to a fixed object relative to the input shaft, for example, a motor housing. The input shaft is connected to the power cable of the motor and rotates relative to the base plate.

By activation of the brake operating device, the friction lining is engaged with the brake disk. By friction between the friction lining rotating with the input shaft and the brake disk, rotation of the input shaft relative to the brake plate is braked and/or stopped.

The spacer serves as a stop for the brake disk so that during release of the brake, the friction lining can be released from the brake disk.

A brake of this type is disclosed in German patent document no. DE 2 660 855 C2. The base plate of the brake disclosed in this German document forms a friction surface. The actuating device and moveable brake disk are held at a distance from the base plate by a spacer sleeve. The brake in DE 2 660 855 C2 requires removal of the actuating device and the moveable brake disk when the friction lining is to be replaced.

Two publications, DD-PS 148 250 and Schiff & Hafen 47, No. 10. Pg. 64 (1995) show brakes with a cover plate that can be adjusted in the axial direction and that forms a friction surface. The disclosed brake cover encloses the interior space of the brake in which the moveable brake disk and the friction lining disk are installed. These brakes cannot function after removal of the brake cover.

However, the ordinary brakes have the drawbacks that they can only be maintained with difficulty. During maintenance, several housing parts must often be removed from the brake in time-consuming fashion and the brake taken out of service. Moreover, brake disks and friction linings of ordinary brakes wear very quickly in crane installations, in harbor use or on ships, which requires frequent maintenance. On wear of the friction lining, this becomes thinner and the looseness of the brake changes. In order to keep the braking torque constant in friction linings that are becoming thinner, the brake clearance of the brake must often be readjusted. Adjustment of the brake clearance is very labor- and time-intensive in ordinary brakes and therefore connected with high cost.

SUMMARY OF THE INVENTION

The underlying task of the present invention is to devise a brake which, in comparison with ordinary brakes, permits a very simple possibility for adjustment of the brake clearance.

This task is solved according to the invention for a brake of the type just mentioned in that a second brake disk is employed that faces away from the brake plate. The second brake disk is connected to the brake operating device in a torsion-proof manner, i.e., it is not rotatable relative to the operating device. A friction lining disk is positioned between the two brake disks, and the brake operating device is positioned between base plate and the two brake disks. During operation of the brake, the second brake disk is held in position by a spacer and fastening screw. The spacer is adjustable in an axial direction of the brake so that the free gap between the two brake disks is adjustable.

This solution is technically simple and has the advantage that the stop for the brake disk is moveable in the axial direction because of the axial adjustability of the spacer. In this manner, the brake clearance can be rapidly adjusted without considerable time expense. Since the spacer is also arranged, like the operating device, on the base plate, the brake disk need not be removed from the base plate to adjust the brake clearance.

In a particularly advantageous embodiment, the spacer can be connected to the operating device. Since the brake disk is connected to the brake operating device and this is connected to the base plate, a design unit is formed in this manner that need not be disassembled during adjustment of the brake clearance. This embodiment is also particularly advantageous when the brake is disengaged by a force exerted by the operating device, for example, a magnetic force. In this case, the brake disk is supported on the spacer during disengagement and power flow is guided directly back into the brake operating device during disengagement.

In another advantageous embodiment, the spacer can be provided at least in the region between the brake disks with a hexagon insert. The brake clearance can be adjusted particularly easily with a corresponding wrench of pliers. Other key forms of the spacer are also possible, which offer a similar adjustment possibility, for example, other polygonal shapes or holes distributed on the periphery.

In another advantageous embodiment, the spacer can have outside threading. The outside thread is cost-effective and simple to manufacture and permits precise adjustment of the brake clearance. In this context, the external thread can advantageously also be configured self-inhibiting in order to prevent displacement of the spacer and thus the brake clearance during operation of the brake.

In another advantageous embodiment, the brake disk can be fastened to the base plate with a fastening screw, in which the fastening screw extends through the spacer. This permits a particularly space-saving and simple design of the brake, in which only a single opening in the operating device need be provided for the spacer and fastening screw. The fastening screw can then run coaxially to the spacer.

Optimal power flow in the brake is obtained if, in another advantageous embodiment, the fastening screw is connected to the base plate. The braking force exerted on the fastening screw by the brake disk is directly introduced to the base plate on this account.

In another advantageous embodiment, the housing can be designed as a bell-shaped hood, which is supported sealed on the base plate and forms a brake interior sealed watertight at least relative to the surrounding of the brake, in which the brake operating device, the friction lining and the brake disk are accommodated. This has the advantage that the brake is easier to maintain because of the bell-shaped housing than ordinary brakes. All essential components of the brake are arranged in the bell-shaped housing with the brake operating device, the friction lining and the brake disk, which can be subject to wear and/or must be regularly maintained. During removal of the bell-shaped hood, these components are freely accessible. The brake remains functional despite the removed hood, since the brake cooperating device, the brake disk and the friction lining are connected to the base plate. In this manner, the function of the brake can be easily checked during maintenance work.

At the same time, no water can penetrate into the interior space of the brake in the brake according to the invention, since the hood is supported tight against the base plate. Wear of the brake is significantly reduced by this. Oxidation of the components in the brake interior, which is favored by the abrasion products of the brake disk remaining in the brake interior, can no longer occur. The components of the brake interior also remain dry in extremely wet and aggressive surroundings. The lifetime of the brake is thus increased precisely in crane installations in harbor areas, which are exposed to aggressive sea water.

In an advantageous embodiment of the invention, a sealing element can be arranged between the base plate and hood. This modification leads to lower manufacturing costs, since precisely adjacent and flush sealing surfaces of the base plate and hood can be dispensed with. Such sealing surfaces must satisfy high tolerance requirements. On the other hand, sealing elements are easy to introduce and compensate for irregularities in the supporting surfaces of the base plate and hood. In particular, this sealing element can be designed as an O-ring.

The embodiment of the brake with a watertight sealing of the brake interior is advantageous, independently of the viewpoint of the configuration of the fastening screw and spacer, so that independent protection is sought for this embodiment.

In other advantageous embodiment, the hood can be connected to the brake operating device. In this variant, no fastening devices need be provided on the base plate for the brake operating device. The base plate can, therefore, be designed as tight plate having no openings through which liquid can penetrate into the brake interior. If the brake operating device and/or the brake disk are connected to the base plate, a design is obtained in which the hood can be easily removed from the brake and operation of the brake is guaranteed particularly simply with the hood removed. It should be kept in mind that the brake disk is axially moveable relative to the base plate in order to permit engagement and disengagement (release) of the brake.

In another advantageous embodiment, it can be prescribed that the bearing points of the brake disk and/or brake operating device are situated exclusively on the base plate. In this case, during loosening of the hood, the brake disk and/or brake operating device remain on the base plate. This also leads to a very simple design configuration of the hood and to a possibility of maintenance of the brake with the hood removed.

Additional devices, like tachometer spindles, can be connected to the input shaft when, in an additional advantageous embodiment of the brake, a flange essentially coaxial to the input shaft is formed on the outside of the hood with a through opening coaxially to the input shaft. The coaxial flange permits attachment of the additional devices to the hood. The coaxial through openings permit lengthening of the input shaft through the brake.

Since the friction lining is subject to abrasion and as a result wear, it is necessary to check the thickness of the friction lining at regular maintenance intervals. Moreover, condensation water can occur in the brake interior, which must be released from time to time. For this purpose, in another advantageous embodiment of the brake, a continuous maintenance opening can be provided which can be closed airtight and/or watertight with a closure element. The maintenance opening can then be arranged on the periphery of the hood in the radial direction relative to the input shaft. Because of the radial shape of the opening, condensation water automatically runs off the maintenance opening situated on the bottom. Moreover, the thickness of the friction lining and brake disk can be inspected through the maintenance openings. The maintenance opening, which runs parallel to the input shaft, can be advantageous for manual release of the brake and has a condensation water discharge hole in a vertical incorporation position. The maintenance opening is expediently designed as a threaded hole, which is preferably closed water- or airtight by a closure screw. The closure screw can have sealing elements, like O-rings, which lead to a particularly tight closure of the threaded hole.

In order to be able to still release seized brakes, for example, after long-term braking and wear of the brake disk and friction lining, in another advantageous embodiment a manual disengagement device, that is moveable relative to the hood, can be provided, which can be transferred to a disengagement position. The brake is released in the disengagement position. The manual disengagement device is mechanically and/or hydraulically connected to the brake disk and/or friction lining. By operation of the manual disengagement device, the brake disk is released from the friction lining. The force applied to the brake disk and/or friction lining by the manual disengagement device is preferably greater than the force applied by the brake operating device so that during defective function of the brake operating device, the brake can be released by the manual disengagement device.

Particularly ergonomic handling is obtained if, in another advantageous embodiment, the manual disengagement device is designed as a lever, which is mounted to pivot on the hood on at least one bearing. High forces for release can be introduced to the brakes by a lever without having to incur high design costs.

In order to avoid entry of water or other corrosive media into the brake interior through the bearing, the bearing can be provided in another advantageous embodiment with at least one bearing seal, through which the bearing is sealed watertight and/or airtight.

A particularly loadable bearing of the manual disengagement device on the hood is obtained if, in another advantageous embodiment, two bearings are provided on two essentially opposite positions of the hood relative to the input shaft and to each other. With this embodiment, very large forces can be introduced into the brake without the hazard of damage to the bearing.

Moreover, in an advantageous embodiment for manual release of the brake an axially moveable disengagement device can be provided through which one brake disk can be moved in a direction away from the other brake disk and the brake disengaged on this account, during which the one brake disk is held at least indirectly by the disengagement device on the base plate when the other brake disk and/or friction lining is removed. The disengagement device therefore fulfills a dual function in which it serves for both release of the brake and also as a maintenance aid, through which the one brake disk can be kept on the brake during maintenance work and need not be disassembled from the brake.

The embodiment of the brake with the disengagement means and disengagement device for manual disengagement of the brake are advantageous independently of the viewpoint of a watertight sealing of the brake interior, so that independent protection is also sought for this embodiment.

In another advantageous embodiment, a brake can have an electronic monitoring device, which is preferably arranged within the hood and through which a signal can be released that represents the function and/or wear of the brake. This electronic monitoring device can be designed, for example, in the form of a microswitch and/or in the form of a proximity switch. The microswitch, like the proximity switch, is capable of recording engagement of the brake or issuing a signal when the thickness of the friction lining falls short of a minimum. This signal can be required, for example, for maintenance purposes in order to be able to establish without intervention on the brake when the friction lining or brake disk must be replaced.

BRIEF DESCRIPTION OF THE DRAWINGS

The invention is explained below by means of two practical examples with reference to the drawings. In the drawings:

FIG. 1 shows the first practical example of the brake according to the invention in a view on one face of the hood;

FIG. 2 shows a cross section along line II—II of FIG. 1;

FIG. 3 shows a cross section through a disengagement device according to the first practical example;

DETAILED DESCRIPTION OF THE INVENTION

Figure 4:
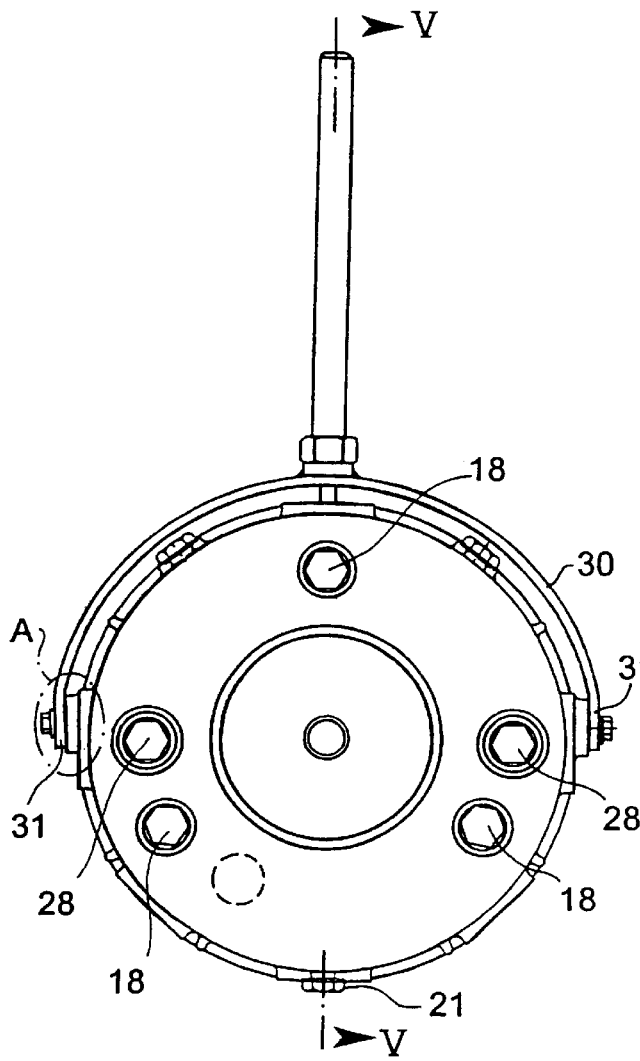
FIG. 4 shows a second practical example of the brake according to the invention in a front view on the hood.

The design of the first practical example of the brake according to the invention is initially described as reference to FIG. 2, which shows a section along line II—II of FIG. 1.

The brake 1 has a base plate 2, on which a brake operating device 4 is fastened via several screws 3 distributed on the periphery. The brake operating device 4 has an electromagnet 5 and a spring element 6 configured as a compression spring. The compression spring 6 is supported between the brake operating device 4 and a brake disk 7.

The brake 1 also has an input shaft 8, which is connected to rotate in unison by means of tapered toothing to a friction lining 9 whose diameter is less than that of brake disk 7.

The friction lining 9 is arranged between the one brake disk 7 and another break disk 10 and, thanks to the tapered toothing, is moveable in the axial direction on the input shaft 8. The brake disks 7, 10 are also moveable in the axial direction of the brake on three screws 11 distributed on the periphery. The brake disks 7, 10 do not have the same diameter.

The brake operating device 4, the two brake disks 7, 10 and the friction lining 9 run coaxially to each other and to a center line M of the input shaft of the input shaft 8, which simultaneously forms the center line of brake 1.

The screw heads of screws 11 simultaneously serve as axial stop for adjustment of the clearance of the brake. The screws 11 extend through brake disk 7 and brake operating device 4 and are screwed to the base plate 2. For this purpose, the brake operating device 4 is provided with a corresponding through opening for each screw 11, which has a threaded section with greater diameter for the brake disks 7, 10. A sleeve 12 is arranged in the threaded section of the brake operating device 4, which extends through the first brake disk 7. Since the second brake disk 10 is provided with a smaller opening, the sleeve 12 is supported in the axial direction on the second outer brake disk 10.

The sleeve has an external threading on the section positioned in the direction of the base plate 2, which is screwed into the threaded section of the operating device 4. The section of sleeve 12 in contact with brake disk 10 is designed as a hexagon. In the corresponding through opening in brake disk 7 sleeve 12 is secured with slight play so that it is mounted rotatable, on the one hand, and can support the brake disk 7 in the peripheral direction, on the other.

The threaded hole to receive screw 11 of base plate 2 is shown continuous in the first practical example, but can also be designed as a blind hole so that the back side of base plate 2 facing away from brake operating device 4 and brake disks 7, 10 is sealed.

The back side of base plate 2 is ordinarily fastened to an electric motor (not shown), whose motor shaft drives the input shaft 8 of brake 1, for example, via an adjusting spring. Fastening openings 13 to receive corresponding screws are provided on base plate 2 to fasten brake 1 to the electric motor. The braking torque is fed to the housing of the electric motor via base plate 2.

In order to configure the base plate 2 tight, the fastening opening 13 can also be designed closeable or as a blind hole. The threaded hole for screw 3, which connects base plate 2 to the brake operating device 4, can also be configured as a blind hole.

The brake operating device 4, the two brake disks 7, 10 and the friction lining 9 are accommodated in a bell-shaped hood 14, which is supported tight against the base plate 2. In order to reinforce the sealing effect, an O-ring 15 is arranged to the sealing element between base plate 2 and hood 14. Hood 14 is screwed to the brake operating device 4 by means of three screws 16 distributed on the periphery and therefore indirectly connected to base plate 2. The screws 16 extend in the axial direction outside of electromagnet through the two brake disks 7, 10. The screws 16 lie on the same diameter as screws 11. In addition, the screws 11 take up part of the braking torque and convey it to base plate 2 via the brake operating device 4.

The screw heads of screws 16 lie in recesses on the front surface 17 of the hood. These recesses have internal threading into which the closure screws 18 are screwed. These closure screws seal the recesses in the hood and the through openings for the screws 16 situated behind them.

Because of sealing 15 and closure screws 18, the brake interior 19, in which the brake operating device 4, the brake disks 7, 10 and the friction lining 9 are accommodated, is sealed in a brake 1 screwed to an electric motor.

Radially running maintenance openings are provided on the axially extending peripheral surface 20 of the hood, which are closed water- and airtight by screws 21. The screws 21 are provided with seals for this purpose.

The closure screw 21 depicted in FIG. 2 is arranged on the bottom in the depicted position of incorporation. The maintenance opening closed by it serves as a condensation water discharge.

The first practical example of brake 1 has a through opening 22 running coaxially to the center line M of the brake, which is enclosed by a flange section 23.

The input shaft 8 likewise has fastening devices 24 on its end facing away from base plate 2 and the electric motor, on which another shaft can be fastened, which passes through opening 22. A tachometer (not shown) can be mounted on the shaft, for example.

A transitional flange for a watertight connection of the brakes to a tachometer housing can be mounted on flange 23. For this purpose the flange section 23 is machined flat so that easy sealing of this surface is possible.

A terminal box 25 which serves for watertight connection of the operating cable for electromagnet 5 and additional electrical devices for wear monitoring, like proximity switches (not shown) is shown in FIG. 2 with a dashed line.

FIG. 1 shows a front view of brake 1 on the hood side. It is apparent here that the terminal box 25 is offset laterally with the cable mounts in the depicted incorporation position for condensation water discharge 21. Moreover, two additional maintenance openings are provided on peripheral surface 20 in hood 14, which are closed water- and airtight with closure screws 26, 27. These two maintenance openings are arranged in the axial direction at the height of friction lining 9 and serve as inspection openings to check the abrasion of the friction lining 9.

Two additional diametrically opposite maintenance openings on the front 17 of hood 2 are also closed water- and airtight by closure screws 28, 29. These openings serve as access openings for a manual release device, which can be seen in FIG. 3. The brake disks 7, 10 are provided with two additional through openings whose position corresponds to the maintenance openings closed by the closure screws 28, 29. Screws 28' are mounted between operating element 4 and the first brake disk 7 behind these through openings, which are accessible through the maintenance openings 28, 29. When closure screws 28, 29 are removed, for example, a wrench can be placed through the maintenance openings and the openings of the brake disks 7, 10 and the screws 28' tightened or loosened.

Figure 5:
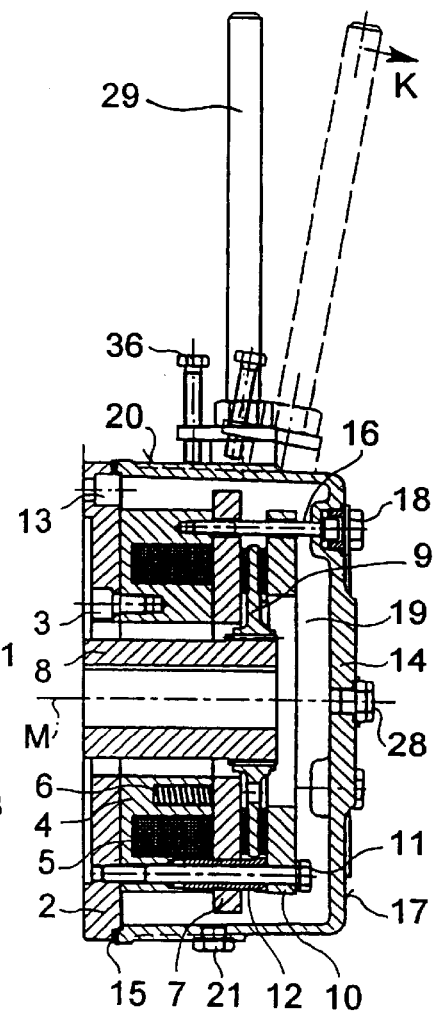
FIG. 5 shows a sectional view of the second practical example of the brake according to the invention in a section along a center axis of the brake.
Figure 6:
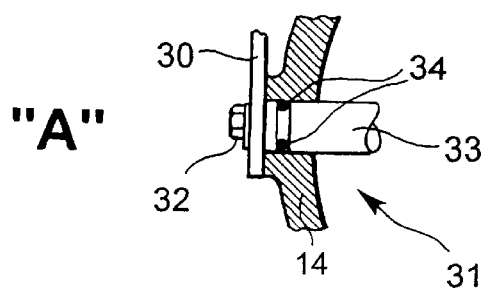
FIG. 6 shows a detail A of FIG. 3 in cross section.

The design of the second practical example is described below with reference to FIGS. 4 to 6.

In the second practical example, the components that correspond in function to the components of the first practical example are provided with the same reference numbers. Explanation of these components is dispensed with in describing the second practical example. The second practical example, in contrast to the first practical example, does not prescribe the connection of an additional shaft for connection of additional devices to the input shaft 8. Consequently, the hood 2 of the second practical example has no flange 23 and no opening 22. The input shaft 8 has no fastening capability 24.

Instead of this, the front surface 17 of hood 2 is provided with a maintenance opening 28 that runs coaxially to the center line M, which serves as a condensation water discharge 28 in a vertical incorporation position. This maintenance opening 28 is also closed water-and airtight by a closure screw.

The second practical example also has a manual disengagement device in the form of a lever 29, which is mounted on two bearings 31 in the axial direction of brake 1 to pivot via fork 30 which partially encloses the peripheral surface 20 of the hood. One of the two bearings 31 is shown as detail A in FIG. 6 in section. Bearings 31 are configured watertight so that no water can penetrate into the brake interior 19 through them.

The fork 30 is connected torsion-proof to a shaft 33 via a shape mating secured by a screw 32. This shape mating is achieved by an external hexagon insert placed on the end of the shaft, which engages in a corresponding internal hexagon insert of lever 30. Screw 32 secures this connection in the axial direction of shaft 33. By rotation of shaft 33, the coupling is released, i.e., the friction lining 9 is forced away from the first brake disk 7. This can occur, for example, by a cam device or a lever on the end of the shaft so that the brake disk 7 is moved in the direction of the operating device against the action of springs 6.

A sealing element 34, in this case an O-ring is arranged between shaft 33 and hood 17. The bearings 31 are sealed against penetration of water into the brake interior 19 by the sealing element 34.

Through a force K that acts on lever 29, this can be pivoted in the axial direction. A screw 36 secured in a nut on lever 29 is supported on the periphery 20 of brake 1 and serves as stop. The screw 36 also serves to fix the lever 29 in the disengagement position, which is shown with a dashed line in FIG. 4. The brake 1 is related in the disengagement position. Moreover, the lever 29 can be moved with greater force into the disengagement position by tightening screw 26.

The function of the brake according to the invention is outlined below.

When electromagnet 5 is disengaged, the compression spring 6 presses brake disk 7 against friction lining 9, which because of its axial displaceability on input shaft 8 is forced against brake disk 10 fixed in the axial direction by screw 11 and sleeve 12. The braking torque flow in the brake runs to base plate 2 in brake disk 7 via sleeve 12 and the operating device 4, on the one hand, and via this to the housing of the electric motor. On the other hand, the braking torque flow migrates from the brake disk 10 via sleeve 12 also over operating device 4 and base plate 2 to the housing of the electric motor.

During engagement of the electromagnet 5 (several electromagnets can also be provided), the brake disk 7 is pulled by the action of the magnetic field in the direction of the operating device 4, i.e., against the force direction of spring 6. Since the brake disk 10 is fixed in the axial direction, it cannot follow the movement of the brake disk 7, so that the brake is released on engagement of electromagnet 5.

By releasing the closure screws 18, the screws 16 on the front surface 17 of hood 2 are accessible and can be loosened. The hood 14 is therefore releasable from base plate 2. The brake disks 7, 10, however, are also connected to the operating device 4 and the base plate 2 via screws 3 and sleeve 12 when the hood 14 is removed. The brake 1 is therefore also completely functional and easy to maintain with the hood 14 removed. A watertight sealing of the brake interior 19, which can also be designed airtight with appropriate modification of the seals known to one skilled in the art, is achieved by seal 15 and by the watertight closure screws 18, 21, 26, 27, 28, 29 on the hood.

If the base plate 2 has only blind holes instead of through openings, tightness can be achieved by the brake according to the invention without additional expedients that withstands pressures up to 100 mbars (1 mH$_2$O). This corresponds to protection class IP 67. The brake according to the invention is therefore corrosion-resistant in the maritime and tropical area. Special protective precautions for moisture-sensitive components, therefore, need not be incorporated in the brake interior 19. These include, for example, electronic monitoring devices, which monitor the thickness of the brake disks between the brake disks 7, 10 and/or the friction lining 9 or engagement of brake 1. These monitoring devices are microswitches or proximity switches.

If the magnetic force exerted by electromagnet 5 is no longer sufficient to release brake 1, for example, when friction lining 9 has seized, the brake 1 in the first practical example can be released by the manual release depicted in FIG. 3. Normally the screw 28', as shown in FIG. 3, is supported in the state loosened as far as possible on brake disk 10 so that it sits fixed during operation of brake 1. For this purpose, the hole 28' of brake disk 10 flush with screw 28" expediently has a smaller diameter than the screw head of screw 28'. For manual release, the closure screw 28 is initially loosened and then a wrench is placed through the maintenance opening and opening 28" and the screw 28' is tightened in the direction of brake disk 7 into the fastening device 4. In this manner the brake disk 7 is moved in the direction of the fastening device against the spring action of spring 6 and the brake is manually released.

The screw 28' also holds the brake disk 7 against the pressure of spring 6 against the operating device 4 during maintenance of brake 1. After loosening the screw 16 and 11, the brake disk 10 and the friction line 9 can therefore be rapidly removed in a manner suitable for maintenance, since they are no longer under the action of spring force.

In the second practical example, the brake is released by operating lever 29. For this purpose, the lever is forced in the axial direction away from base plate 2.

Even if a manual disengagement device 29, 30, 31 is provided, because of the sealed bearing 31, a water resistance to 100 mbars (1 mH$_2$O) can be achieved, i.e., a protection class IP 67. Despite the protection class, because of the bell-shaped hood 14 and the arrangement of the components of brake 1 on base plate 2, easy maintenance is possible without having to disassemble brake 1 from the electric motor or to dismantle brake 1 or brake disks 7, 10 or the brake operating device 4 from the base plate 2 and the friction lining 9 from the input shaft 8.

Abrasion of the friction lining 9 is compensated by axial displacement of brake disk 10 by means of sleeve 12 and screw 11 so that the clearance of brake 1 remains essentially constant. For this purpose, with hood 17 removed, the sleeve 12 is initially screwed further into the fastening device. Sleeve 12 serves as a stop in the axial direction in the direction of operating device 4. If this stop is displaced in the direction of the operating device or in the direction of the friction lining, the brake disk 10 migrates closer to the other brake disk 7 and the gap between the two brake disks is reduced. In this manner the original brake clearance is restored and the abrasion of the friction lining 9 is compensated. Screw 11 is then retightened so that the brake disk 10 is clamped fixed between sleeve 12 and screw 11. The external hexagon insert of sleeve 12 in the region of the gap between the two brake disks 7, 10 facilitates tightening of sleeve 12. To adjust the clearance in the brake, only the hood 17 need be removed from the brake.

The two depicted practical examples of brake 1 each represent an electromagnetic two-faced spring-loaded brake, which is ordinarily designed for braking torques between 100 Nm and 1600 Nm. The base plate is designed as a normal flange with diameters between 200 mm and 800 mm. The hood 12 is made from cast iron. The depicted brakes are used, for example, as crane brakes on ships and in harbors.

We claim:

1. Brake apparatus comprising in combination:
    a base plate;
    a first brake disk movable in an axial direction;
    a second brake disk positioned remote from said base plate relative to said first brake disk;
    a brake operating device connected with said first and second brake disks in a torsion-proof manner and positioned between said base plate and said first and second brake disks;
    a friction lining positioned between said first and second brake disks and carried on an input shaft in a torsion-proof manner relative to said input shaft, wherein said input shaft is rotatable relative to said base plate; and
    a spacer in the form of a sleeve and having a fastener passing through said sleeve, whereby said sleeve is adjustable in said axial direction to keep a distance between said first and second brake disks, and wherein said sleeve and said fastener axially retain said second brake disk at said distance from said first brake disk during operation of said brake apparatus,
    wherein bearing points of at least one of said first brake disk, of said second brake disk, and said brake operating device are situated exclusively on said base plate.

2. Brake apparatus according to claim 1, wherein the base plate is attached to an electric motor.

3. Brake apparatus according to claim 1, wherein said sleeve is connected to said brake operating device.

4. Brake apparatus according to claim 1, wherein said sleeve has an external hexagonal surface at least in a region between said second brake disk and said brake operating device.

5. Brake apparatus according to claim 1, wherein said sleeve has external threading.

6. Brake apparatus according to claim 1, wherein said fastener runs coaxially to said sleeve.

7. Brake apparatus according to claim 1, wherein said fastener is connected to said base plate.

8. Brake apparatus according to claim 1, further comprising a bell-shaped hood supported tight against said base plate and forming a brake interior sealed at least watertight relative to external surroundings of said brake apparatus, wherein said brake operating device, said friction lining, and said first and second brake disks are accommodated in said brake interior.

9. Brake apparatus according to claim 8, further comprising a sealing element arranged between said base plate and said hood.

10. Brake apparatus according to claim 9, wherein said sealing element is an O-ring.

11. Brake apparatus according to claim 8, wherein said hood is connected to said brake operating device.

12. Brake apparatus according to claim 1, wherein said brake operating device is connected to said base plate.

13. Brake apparatus according to claim 1, wherein said first and second brake disks are connected axially moveable to said base plate.

14. Brake apparatus according to claim 8, further comprising a flange formed on a front side of said hood and arranged coaxial to said input shaft and providing a through opening arranged coaxial to said input shaft.

15. Brake apparatus according to claim 8, wherein said hood has at least one through maintenance opening which can be connected in at least one of an airtight and a watertight manner to a closure element.

16. Brake apparatus according to claim 15, wherein said maintenance opening is arranged on a periphery of said hood in a radial direction relative to said input shaft.

17. Brake apparatus according to claim 15, wherein said maintenance opening is arranged generally parallel to said input shaft on a front surface of said hood.

18. Brake apparatus according to claim 15, wherein said maintenance opening is a threaded hole, closed by a closure screw.

19. Brake apparatus according to claim 8, wherein said brake apparatus has a manual disengagement device that is moveable relative to said hood, said manual disengagement device being transferable to a disengagement position in which the brake apparatus is released.

20. Brake apparatus according to claim 19, wherein said manual disengagement device has a lever mounted to pivot on said hood on at least one bearing.

21. Brake apparatus according to claim 20, wherein a fork is provided between said lever and said at least one bearing, and wherein said fork at least partially encloses said hood.

22. Brake apparatus according to claim 20, wherein said at least one bearing is provided with at least one bearing sealing element through which said at least one bearing is sealed at least one of watertight and airtight.

23. Brake apparatus according to claim 20, further comprising two bearings positioned opposite one another on said hood relative to said input shaft.

24. Brake apparatus according to claim 1, further comprising an axially moveable disengagement means provided for manual disengagement of said brake apparatus, wherein said first brake disk can be moved in a direction away from said second brake disk, and wherein said brake apparatus is disengageable, whereby said first brake disk is held at least indirectly by said disengagement means on said base plate when at least one of said second brake disk and said friction lining is removed.

25. Brake apparatus according to claim 8, wherein said brake apparatus has an electronic monitoring device that is arranged within said hood and adapted to issue a signal which is representative of at least one of a brake function parameter and a brake wear parameter.

26. Brake apparatus according to claim 25, wherein said electronic monitoring device has a switch selected from at least one of a microswitch and proximity switch.

27. Brake apparatus according to claim 1, wherein said brake operating device has at least one electromagnet with a magnetic field that acts on said first brake disk such that during magnetic activation the brake apparatus is disengageable.

28. Brake apparatus according to claim 1, wherein said brake operating device has at least one spring element supported between said base plate and said first brake disk whereby said first and second brake disks and said friction lining are forced together.

29. Brake apparatus according to claim 1, wherein the brake apparatus is an electromagnet two-faced spring-loaded brake.

* * * * *